(12) United States Patent
Neelagiri et al.

(10) Patent No.: US 12,170,079 B2
(45) Date of Patent: Dec. 17, 2024

(54) SYSTEM AND METHOD FOR IMPROVING NAMED ENTITY RECOGNITION

(71) Applicant: Samsung Electronics Co., Ltd., Suwon-si (KR)

(72) Inventors: Divya Neelagiri, Dublin, CA (US); Taeyeon Ki, Milpitas, CA (US); Vijendra Raj Apsingekar, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 482 days.

(21) Appl. No.: 17/444,367

(22) Filed: Aug. 3, 2021

(65) Prior Publication Data

US 2023/0040181 A1    Feb. 9, 2023

(51) Int. Cl.
*G10L 15/06* (2013.01)
*G10L 15/18* (2013.01)
*G10L 15/26* (2006.01)

(52) U.S. Cl.
CPC ............ *G10L 15/063* (2013.01); *G10L 15/18* (2013.01); *G10L 15/26* (2013.01)

(58) Field of Classification Search
CPC ....... G10L 15/063; G10L 15/18; G10L 15/26; G10L 15/08; G06N 7/01; G06F 40/30
See application file for complete search history.

(56) References Cited

U.S. PATENT DOCUMENTS

| | | | |
|---|---|---|---|
| 7,289,956 B2 | 10/2007 | Yu et al. | |
| 9,202,176 B1 * | 12/2015 | Kapur | G06N 7/01 |
| 9,355,638 B2 | 5/2016 | Melamed et al. | |
| 10,074,371 B1 * | 9/2018 | Wang | G10L 15/08 |
| 10,628,483 B1 * | 4/2020 | Rao | G06F 16/683 |
| 10,782,986 B2 | 9/2020 | Martin | |

(Continued)

FOREIGN PATENT DOCUMENTS

| | | | | |
|---|---|---|---|---|
| CN | 110738997 A | | 1/2020 | |
| CN | 112347768 A | * | 2/2021 | ....... G06F 16/90344 |

OTHER PUBLICATIONS

Thibault Doutre . Wei Han . Min Ma . Zhiyun Lu . Chung-Cheng Chiu . Ruoming Pang . Arun Narayanan . Ananya Misra . Yu Zhang . Liangliang Cao, Improving Streaming Automatic Speech Recognition with Non-Streaming Model Distillation on Unsupervised Data, 2021, IEEE. (Year: 2021).*

*Primary Examiner* — Vijay B Chawan
*Assistant Examiner* — Nadira Sultana

(57) ABSTRACT

A method includes training a set of teacher models. Training the set of teacher models includes, for each individual teacher model of the set of teacher models, training the individual teacher model to transcribe unlabeled audio samples and predict a pseudo labeled dataset having multiple labels. At least some of the unlabeled audio samples contain named entity (NE) audio data. At least some of the labels include transcribed NE labels corresponding to the NE audio data. The method also includes correcting at least some of the transcribed NE labels using user-specific NE textual data. The method further includes retraining the set of teacher models based on the pseudo labeled dataset from a selected one of the teacher models, where the selected one of the teacher models predicts the pseudo labeled dataset more accurately than other teacher models of the set of teacher models.

20 Claims, 6 Drawing Sheets

(56) References Cited

U.S. PATENT DOCUMENTS

| | | | |
|---|---|---|---|
| 11,238,227 B2* | 2/2022 | Velikovich | G10L 15/22 |
| 11,429,860 B2* | 8/2022 | Li | G06N 20/00 |
| 11,682,400 B1* | 6/2023 | Liu | G06F 40/30 |
| | | | 704/270 |
| 12,020,693 B2* | 6/2024 | Jaber | G10L 15/22 |
| 2018/0182391 A1 | 6/2018 | Lee et al. | |
| 2020/0410388 A1* | 12/2020 | Liu | G06N 7/01 |
| 2021/0012769 A1 | 1/2021 | Vasconcelos et al. | |
| 2021/0390951 A1* | 12/2021 | Gadde | G06F 40/30 |

* cited by examiner

SYSTEM AND METHOD FOR IMPROVING NAMED ENTITY RECOGNITION

TECHNICAL FIELD

This disclosure relates generally to machine learning systems. More specifically, this disclosure relates to a system and method for improving named entity (NE) recognition.

BACKGROUND

A named entity (NE) is a real-world object, such as a person, place, organization, product, or the like, that is identified with a proper name. Most conventional automatic speech recognition (ASR) systems exhibit poor recognition of named entities over general utterances. This is because the amount of training data available for named entities is limited compared to the number of existing named entities. Even for the available data, pronunciation of a named entity can vary based on accent, regional differences, and other spoken attributes. In some cases, a large volume of usage data with varying speakers or accents is available, although there are no transcriptions for audios available.

SUMMARY

This disclosure provides a system and method for improving named entity recognition.

In a first embodiment, a method includes training, using at least one processor of an electronic device, a set of teacher models. Training the set of teacher models includes, for each individual teacher model of the set of teacher models, training the individual teacher model to transcribe unlabeled audio samples and predict a pseudo labeled dataset having multiple labels. At least some of the unlabeled audio samples contain named entity (NE) audio data. At least some of the labels include transcribed NE labels corresponding to the NE audio data. The method also includes correcting, using the at least one processor, at least some of the transcribed NE labels using user-specific NE textual data. The method further includes retraining, using the at least one processor, the set of teacher models based on the pseudo labeled dataset from a selected one of the teacher models, where the selected one of the teacher models predicts the pseudo labeled dataset more accurately than other teacher models of the set of teacher models.

In a second embodiment, an electronic device includes at least one memory configured to store instructions. The electronic device also includes at least one processing device configured when executing the instructions to train a set of teacher models. To train the set of teacher models, the at least one processing device is configured when executing the instructions to, for each individual teacher model of the set of teacher models, train the individual teacher model to transcribe unlabeled audio samples and predict a pseudo labeled dataset having multiple labels. At least some of the unlabeled audio samples contain NE audio data. At least some of the labels include transcribed NE labels corresponding to the NE audio data. The at least one processing device is also configured when executing the instructions to correct at least some of the transcribed NE labels using user-specific NE textual data. The at least one processing device is further configured when executing the instructions to retrain the set of teacher models based on the pseudo labeled dataset from a selected one of the teacher models, where the selected one of the teacher models is configured to predict the pseudo labeled dataset more accurately than other teacher models of the set of teacher models.

In a third embodiment, a non-transitory machine-readable medium contains instructions that when executed cause at least one processor of an electronic device to train a set of teacher models. The instructions that when executed cause the at least one processor to train the set of teacher models include instructions that when executed cause the at least one processor, for each individual teacher model of the set of teacher models, to train the individual teacher model to transcribe unlabeled audio samples and predict a pseudo labeled dataset having multiple labels. At least some of the unlabeled audio samples contain NE audio data. At least some of the labels include transcribed NE labels corresponding to the NE audio data. The medium also contains instructions that when executed cause the at least one processor to correct at least some of the transcribed NE labels using user-specific NE textual data. The medium further contains instructions that when executed cause the at least one processor to retrain the set of teacher models based on the pseudo labeled dataset from a selected one of the teacher models, where the selected one of the teacher models is configured to predict the pseudo labeled dataset more accurately than other teacher models of the set of teacher models.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member,"

"apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, a named entity (NE) is a real-world object, such as a person, place, organization, product, or the like, that is identified with a proper name. Most conventional automatic speech recognition (ASR) systems exhibit poor recognition of named entities over general utterances. This is because the amount of training data available for named entities is limited compared to the number of existing named entities. Even for the available data, pronunciation of a named entity can vary based on accent, regional differences, and other spoken attributes. In some cases, a large volume of usage data with varying speakers or accents is available, although there are no transcriptions for audios available. Even in cases that have manual transcriptions, a labeler may not know which specific NE a user was referring to, so there may be incorrect labelling in cases of ambiguous named entities.

In some approaches, a semi-supervised pipeline (SSP) can be used to transcribe available usage data. For example, SSP techniques can take untranscribed data and predict a set of labels, which can be used in ASR training. However, SSP techniques with multiple acoustic and general language models do not consider user-specific NE data to improve recognition and thus may not be able to capture a user's specific NE words (such as "Jon" instead of "John" or "Savanna" instead of "Savannah"). The original training data for the SSP models may have been trained on only popular variations of named entities (such as "John" or "Savannah").

This disclosure provides systems and methods for improving NE recognition using an SSP. The disclosed systems and methods can be used to improve NE recognition by using a user's specific data in the SSP and retraining the SSP with the NE data and with configurable NE loss for misrecognized named entities. The disclosed embodiments can reduce costs by reducing transcription times, such as from days to hours. Note that while some of the embodiments discussed below are described in the context of ASR for use in consumer electronic devices, this is merely one example, and it will be understood that the principles of this disclosure may be implemented in any number of other suitable contexts.

Figure 1:
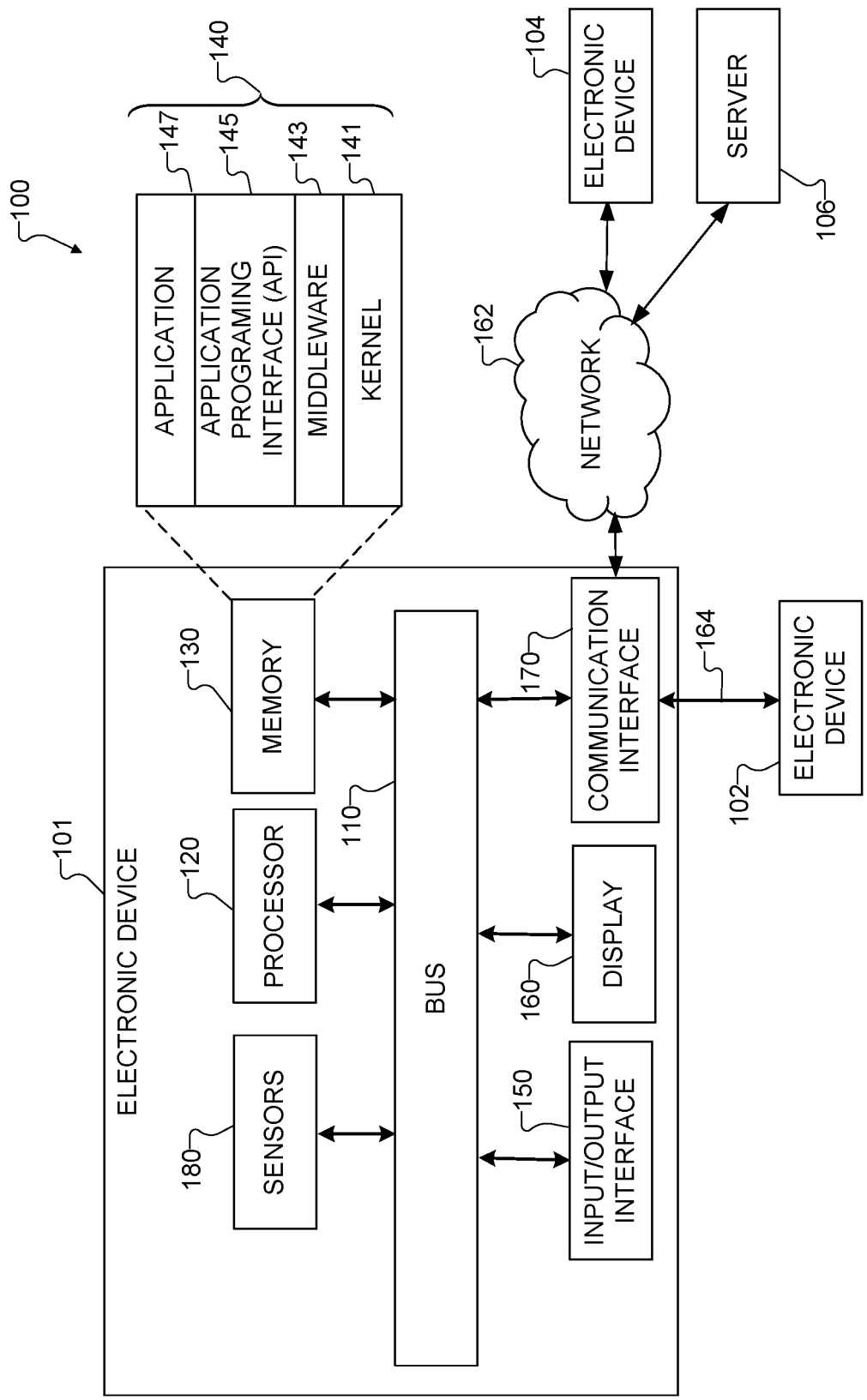
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations for improving NE recognition using an SSP.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for improving NE recognition using an SSP as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for improving NE recognition using an SSP.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
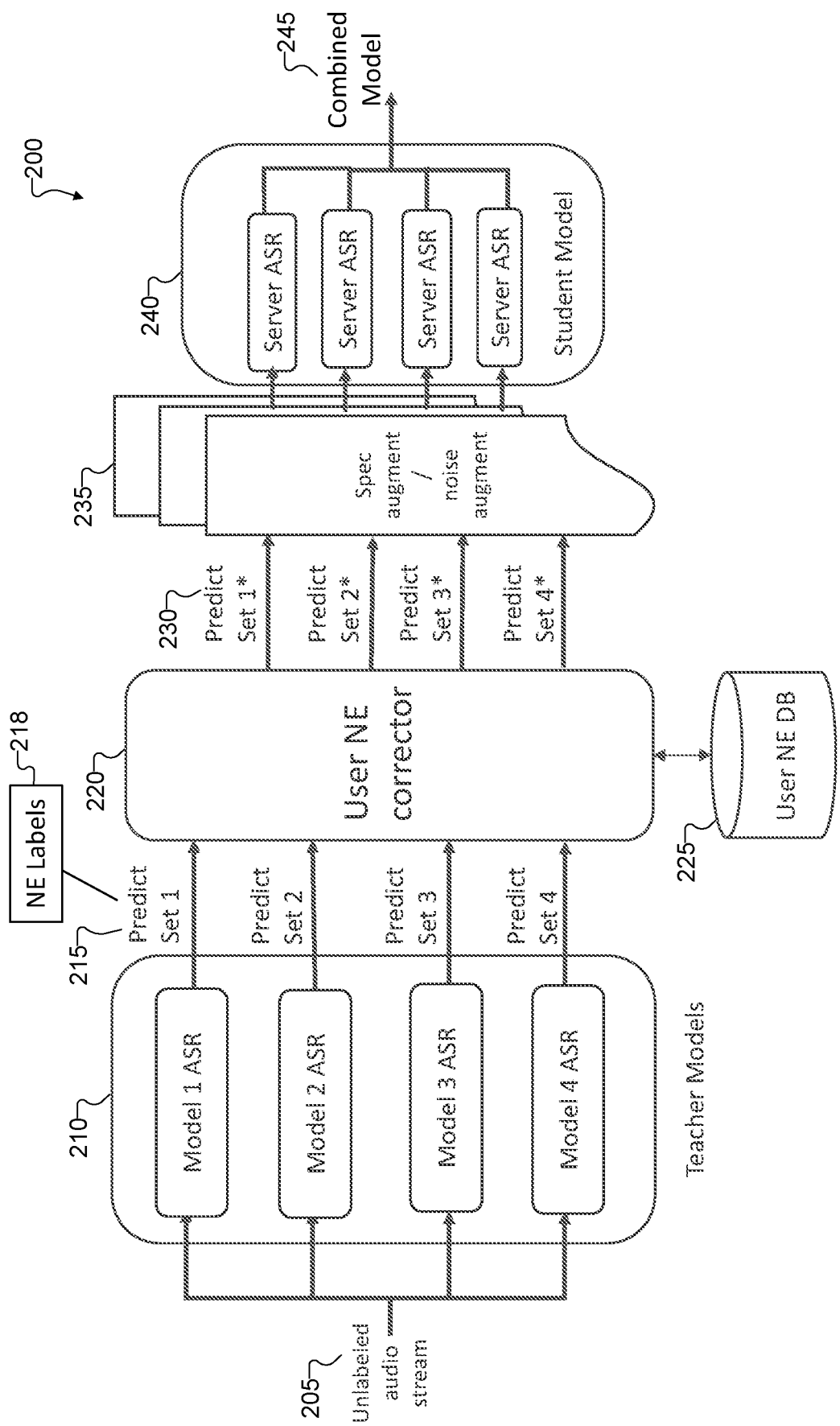
FIG. 2 illustrates an example framework for improving named entity (NE) recognition using a semi-supervised pipeline (SSP) according to this disclosure.

FIG. 2 illustrates an example framework 200 for improving NE recognition using an SSP according to this disclosure. Note that the framework 200 is described as being implemented using one or more components of the electronic device 101 described above. However, this is merely one example, and the framework 200 could be implemented using any other suitable device(s), such as when implemented using the server 106.

As shown in FIG. 2, using the framework 200, the electronic device 101 receives a stream of unlabeled audio samples 205. The unlabeled audio samples 205 represent samples of audio-only data (no text associated with the audio data) from one or more sources. In some embodiments, the unlabeled audio samples 205 can include audio data obtained from one or more users using a virtual assistant. For example, the audio data can include a command or question that a user has spoken to the virtual assistant. However, this is merely one example, and the unlabeled audio samples 205 can represent other suitable type(s) of data. In accordance with this disclosure, at least some of the unlabeled audio samples 205 contains NE audio data, such as a spoken representation of "John," "Mountain View," or the like.

The electronic device 101 trains a set of teacher models 210 to transcribe the unlabeled audio samples 205. Each teacher model 210 represents a machine learning-based ASR model for identifying and tagging audio samples. In some embodiments, each teacher model 210 is a semi-supervised model that is part of an SSP represented in the framework 200. While four teacher models 210 are shown in FIG. 2, this is merely one example, and any suitable number of teacher models 210 could be used. In some embodiments, each of the teacher models 210 is of a different architecture in order to reduce bias in training. However, in some embodiments, two or more of the teacher models 210 may be of the same or similar architecture.

During training, each of the teacher models 210 transcribes the unlabeled audio samples 205 and predicts a pseudo labeled dataset 215 for the unlabeled audio samples 205. The pseudo labeled dataset 215 represents a hypothesis of the unlabeled audio samples 205. Each pseudo labeled dataset 215 includes transcribed data (textual data) with labels that correspond to the unlabeled audio samples 205. When a teacher model 210 encounters NE audio data in the unlabeled audio samples 205, the teacher model 210 generates one or more NE labels 218 corresponding to the NE audio data. Each NE label 218 includes one or more tags indicating a category of the NE label. For example, a <CONTACT> tag can be used to indicate a contact name. A <PLACE> tag can be used to indicate the name of a city or other geographical region. A <SONG> tag can represent a song title, and an <ARTIST> tag can represent the name of an artist. Other tags can represent other NE categories.

As a particular example, two of the unlabeled audio samples 205 can include the spoken utterances "Call John" and "Navigate to Mountain View." Each of the teacher models 210 transcribes these unlabeled audio samples 205 and generates NE labels 218, such as "<CONTACT> John <CONTACT>" and "<PLACE> MOUNTAIN VIEW <PLACE>". Because the teacher models 210 can be of different architectures or identical/similar architectures that are trained differently, the teacher models 210 may generate different NE labels 218 for a given unlabeled audio sample 205. For instance, for the unlabeled audio sample 205 "Call John," a first teacher model 210 (such as Model 1 ASR) may generate an NE label 218 of "<CONTACT> John <CONTACT>", a second teacher model 210 (such as Model 2 ASR) may generate an NE label 218 of "<CONTACT> Jane <CONTACT>", and a third teacher model 210 (such as Model 3 ASR) may generate an NE label 218 of "<CONTACT> Jan <CONTACT>".

Because the pseudo labeled datasets 215 generated by the teacher models 210 may include different NE labels 218 for a given unlabeled audio sample 205, one or more of the NE labels 218 is incorrect (the NE label 218 includes an incorrect tag). To correct the incorrect NE labels 218, the electronic device 101 performs a user NE corrector process 220, which compares the NE labels 218 of the pseudo labeled datasets 215 to information contained in a user NE database 225 in order to correct the incorrect NE labels 218. The objective of the user NE corrector process 220 is to generate updated pseudo labeled datasets 230 that include zero or minimal incorrect NE labels 218.

Figure 3:
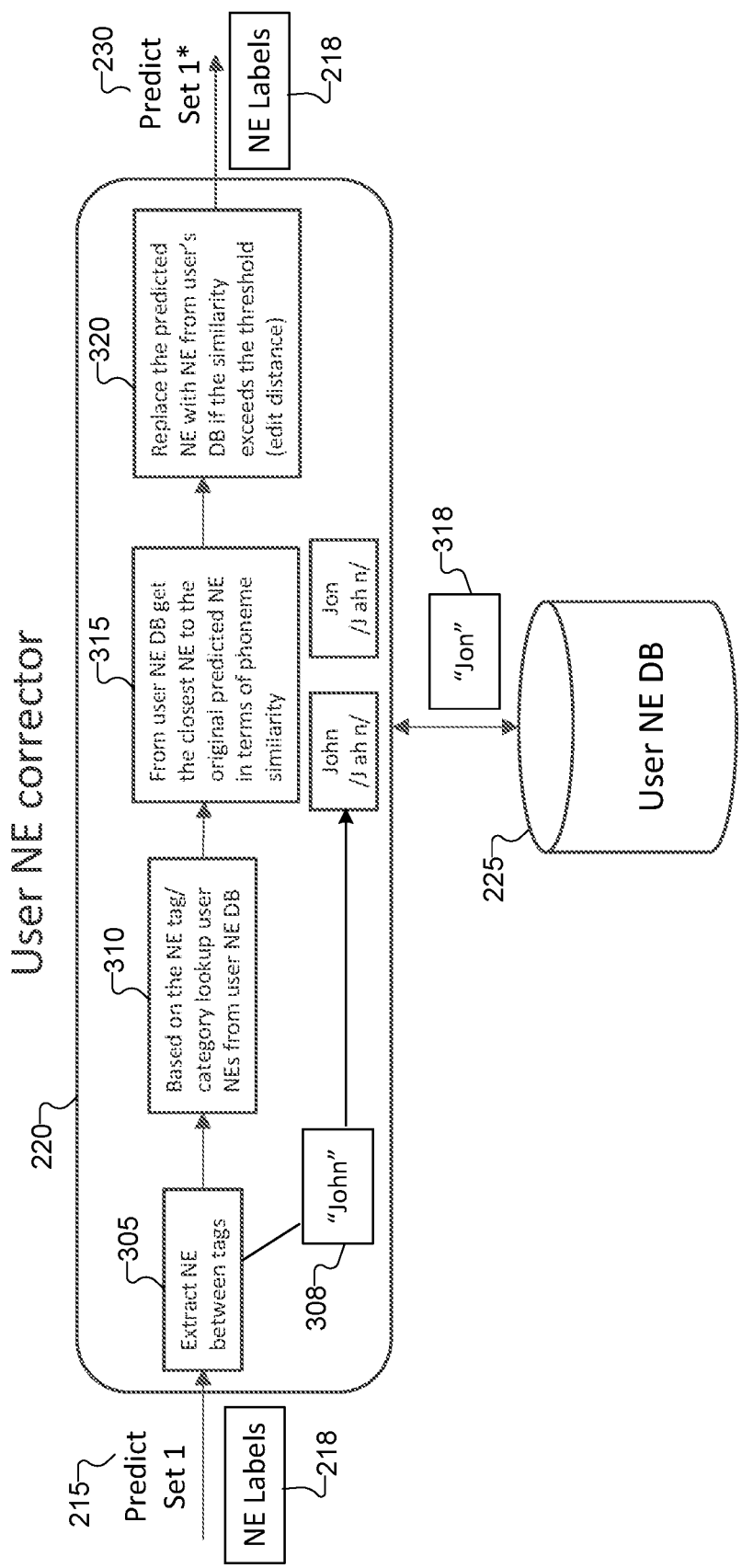
FIG. 3 illustrates further details of an example user NE corrector process used in the framework of FIG. 2 according to this disclosure.

FIG. 3 illustrates further details of an example user NE corrector process 220 for use in the framework 200 according to this disclosure. In performing the user NE corrector process 220, the electronic device 101 may consider the NE labels 218 of the pseudo labeled datasets 215. That is, the electronic device 101 may consider the labels that have any of the NE tags, such as <CONTACT>, <PLACE>, or the like. Labels that are not associated with a named entity may be ignored or simply not provided as input to the user NE corrector process 220.

As shown in FIG. 3, the electronic device 101 obtains the NE labels 218 of one of the pseudo labeled datasets 215 (such as "Predict Set 1") for input to the user NE corrector process 220. At operation 305, the electronic device 101 extracts the named entity 308 between tags in each of the NE labels 218. Thus, using the examples above, the electronic device 101 extracts the named entity 308 "John" from between the <CONTACT> tags and extracts the named entity 308 "Mountain View" from between the <PLACE> tags.

At operation 310, the electronic device 101 performs a search of the user NE database 225 for each of the named entities 308 extracted at operation 305. The user NE database 225 is a database of named entity textual information and contains information such as contacts, music songs and artists, points of interest (POIs) and their addresses, and the like. In some embodiments, the user NE database 225 is generated over time using source data from system end users, metadata from commercially-available databases, Internet searches, other sources, or a combination of these. While the user NE database 225 is described here as a database, the user NE database 225 represents any suitable collection of named entities arranged or stored in any suitable manner.

At operation 315, the electronic device 101 obtains a named entity 318 from the user NE database 225 that is the closest (such as has the greatest phoneme similarity) to the extracted named entity in the NE label 218. For example, the named entity 308 may be "John." If "John" is present in the user NE database 225, the named entity 308 is considered to be correct and is not corrected. If "John" is not present in the user NE database 225 but "Jon" is present in the user NE database 225 and is phonemically similar to "John," the named entity 308 "John" is considered to be incorrect, and the electronic device 101 obtains "Jon" from the user NE database 225.

At operation 320, if the named entity 308 is incorrect, the electronic device 101 replaces the named entity 308 with the named entity 318 from the user NE database 225 (which may occur if the phonemic similarity exceeds a threshold amount). The named entity 318 from the user NE database 225 becomes the named entity 308 for the NE label 218 that is used in the updated pseudo labeled dataset 230. For example, "Jon" is phonemically similar to "John," so "John" can be replaced with "Jon" in the updated pseudo labeled dataset 230. If the phonemic similarity between the named entity 308 and the named entity 318 is less than the threshold amount, the named entity 308 may be marked for further processing. In some embodiments, an edit distance algorithm can be used to determine the phonemic similarity.

Figure 4:
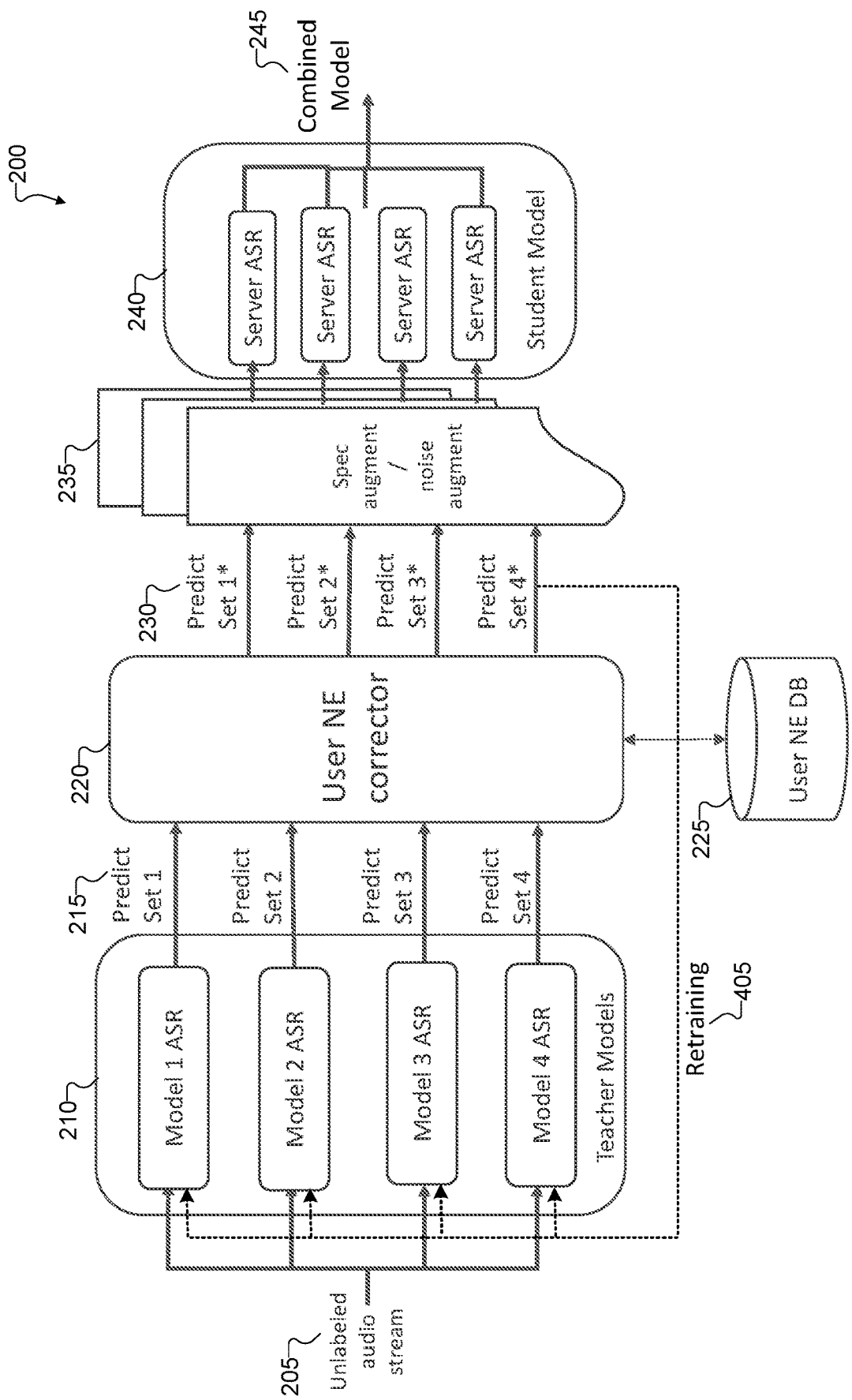
FIGS. 4 and 5 illustrate details of an example retraining process for use in the framework of FIG. 2 according to this disclosure.
Figure 5:
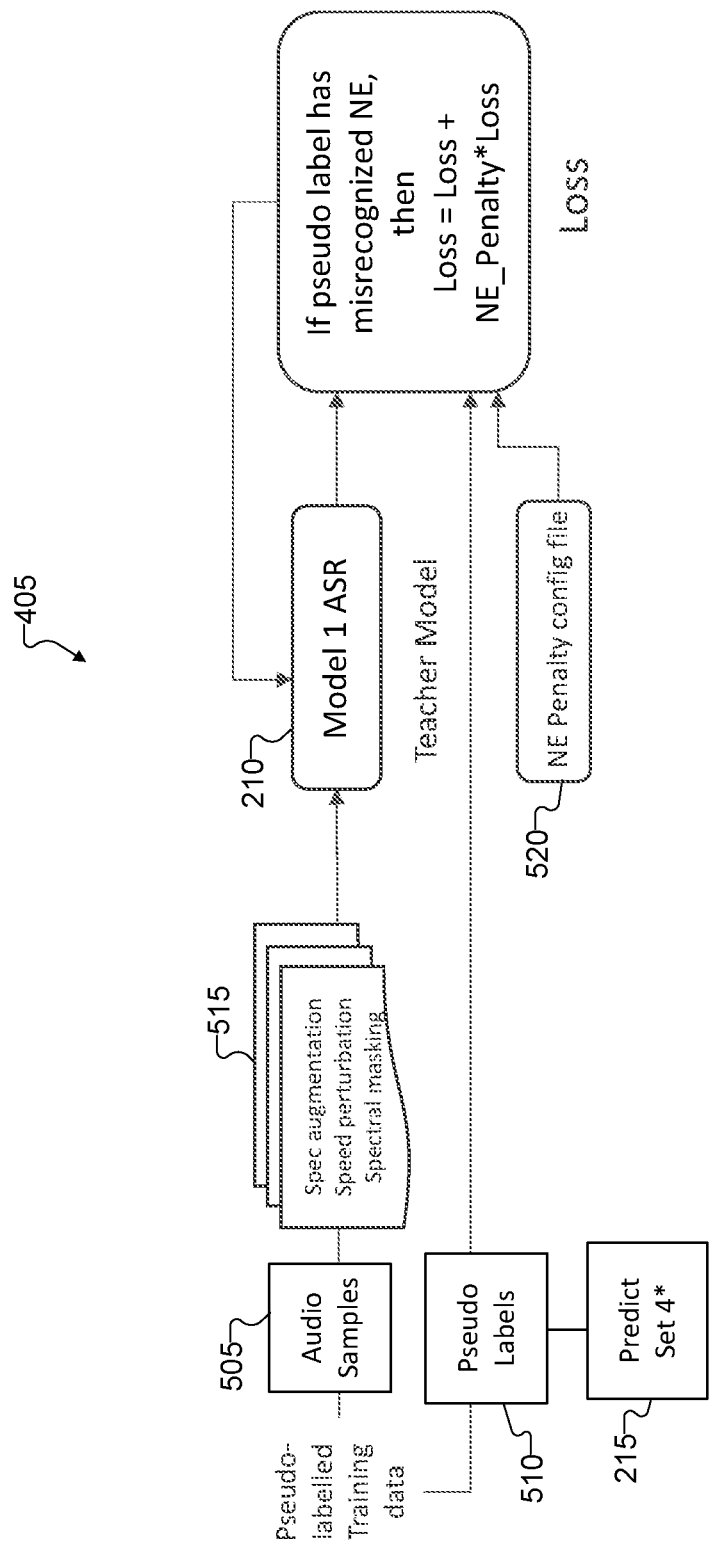

The electronic device 101 repeats the user NE corrector process 220 for each of the pseudo labeled datasets 215 to generate each of the updated pseudo labeled datasets 230. Once the updated pseudo labeled datasets 230 are generated, the electronic device 101 can retrain the teacher models 210 using the updated pseudo labeled datasets 230 as inputs. FIGS. 4 and 5 illustrate details of an example retraining process 405 for use in the framework 200 according to this disclosure.

As shown in FIG. 4, the electronic device 101 selects the teacher model 210 that exhibits the best performance during training. In some embodiments, best performance can be represented by the most accurate teacher model 210. For example, the teacher model 210 having the fewest replaced named entities 308 may be selected as having the best performance. In FIG. 4, it is determined that the teacher model 210 identified as "Model 4 ASR" is the best performer. Thus, the electronic device 101 uses the updated pseudo labeled dataset 230 from the teacher model 210 "Model 4 ASR" with corresponding unlabeled audio samples 205 to retrain all of the teacher models 210.

As shown in FIG. 5, the pseudo labeled training data for retraining the teacher models 210 includes audio samples 505 and pseudo labels 510 from the updated pseudo labeled dataset 230 of the best performing teacher model 210 (such as Predict Set 4*). As discussed above, the pseudo labels 510 can include one or more NE labels 218. In some embodiments, one or more augmentation operations 515 (such as spectral augmentation, speed perturbation, spectral masking, and the like) can be applied to the audio samples 505. When retraining the teacher models 210, the electronic device 101 can penalize an individual teacher model 210 when the teacher model 210 mis-recognizes a named entity (when an NE label 218 output by the teacher model 210 do not match the transcribed NE labels 218 among the pseudo labels 510).

In some embodiments, penalizing of a teacher model 210 can be performed using a variable loss. For example, the loss can be determined by referring to an NE penalty configuration file 520, which may be used to control the size of the penalty. The NE penalty configuration file 520 can include predetermined penalty values for each type of named entity. Table 1 shows an example embodiment of an NE penalty configuration file 520, which identifies different types of named entities and their associated penalties. Here, the overall loss can be increased by the value defined in the NE penalty configuration file 520 for the named entity at issue. Also, in some embodiments, weights used for model prediction can be updated to minimize the loss, meaning the weights can be adjusted to improve the prediction of named entities.

TABLE 1

Example NE Penalty Configuration File

| NE Type | Penalty |
|---------|---------|
| CONTACT | 0.4 |
| PLACE | 0.1 |
| SONG | 0.2 |
| ARTIST | 0.2 |

Turning again to FIG. 2, the electronic device 101 uses the updated pseudo labeled datasets 230 to train multiple student models 240. In some embodiments, before the updated pseudo labeled datasets 230 are provided to the student models 240 for training, the electronic device 101 performs an augmentation operation 235 on at least some of the data in the updated pseudo labeled datasets 230. Using the augmentation operation 235, the electronic device 101 can optionally apply spectral augmentation, noise augmentation, or a combination of these to insert noise or spectral masking into the updated pseudo labeled datasets 230. In some embodiments, different background noises can be inserted into the data to generate multiple noisy samples (each having a different noise augmentation). The noise can help train the student models 240 to perform better when encountering noise in run-time scenarios.

The updated pseudo labeled datasets 230 of each teacher model 210 are used to train the student models 240. In some embodiments, the student models 240 are of the same architecture and may represent different instances of the same model. In other embodiments, one or more student models 240 may be different from other student models 240. Typically, the number of student models 240 is the same as the number of teacher models 210 for corresponding training. Each student model 240 is trained using the updated pseudo labeled dataset 230 from a corresponding one of the different teacher models 210. The results from the student models 240 can be averaged to produce a final combined model 245. The averaging may be performed to avoid overfitting to one model or set of data. The combined model 245 is better at overall NE recognition than models trained using conventional techniques. In some embodiments, the combined model 245 can be installed on a consumer device for use with a virtual assistant operation or the like.

Note that the operations and functions shown in FIGS. 2 through 5 can be implemented in an electronic device 101, server 106, or other device in any suitable manner. For example, in some embodiments, the operations and functions shown in FIGS. 2 through 5 can be implemented or supported using one or more software applications or other software instructions that are executed by the processor 120 of the electronic device 101, server 106, or other device. In other embodiments, at least some of the operations and functions shown in FIGS. 2 through 5 can be implemented or supported using dedicated hardware components. In general, the operations and functions shown in FIGS. 2 through 5 can be performed using any suitable hardware or any suitable combination of hardware and software/firmware instructions.

Although FIGS. 2 through 5 illustrate one example of a framework 200 for improving NE recognition using an SSP and related details, various changes may be made to FIGS. 2 through 5. For example, while the framework 200 is described with four teacher models 210 and four student models 240, other embodiments could include other numbers of AI models to train. Also, while shown as a specific sequence of operations, various operations shown in FIGS.

2 through 5 could overlap, occur in parallel, occur in a different order, or occur any number of times (including zero times). In addition, the specific operations shown in FIGS. 2 through 5 are examples only, and other techniques could be used to perform each of the operations shown in FIGS. 2 through 5.

Figure 6:
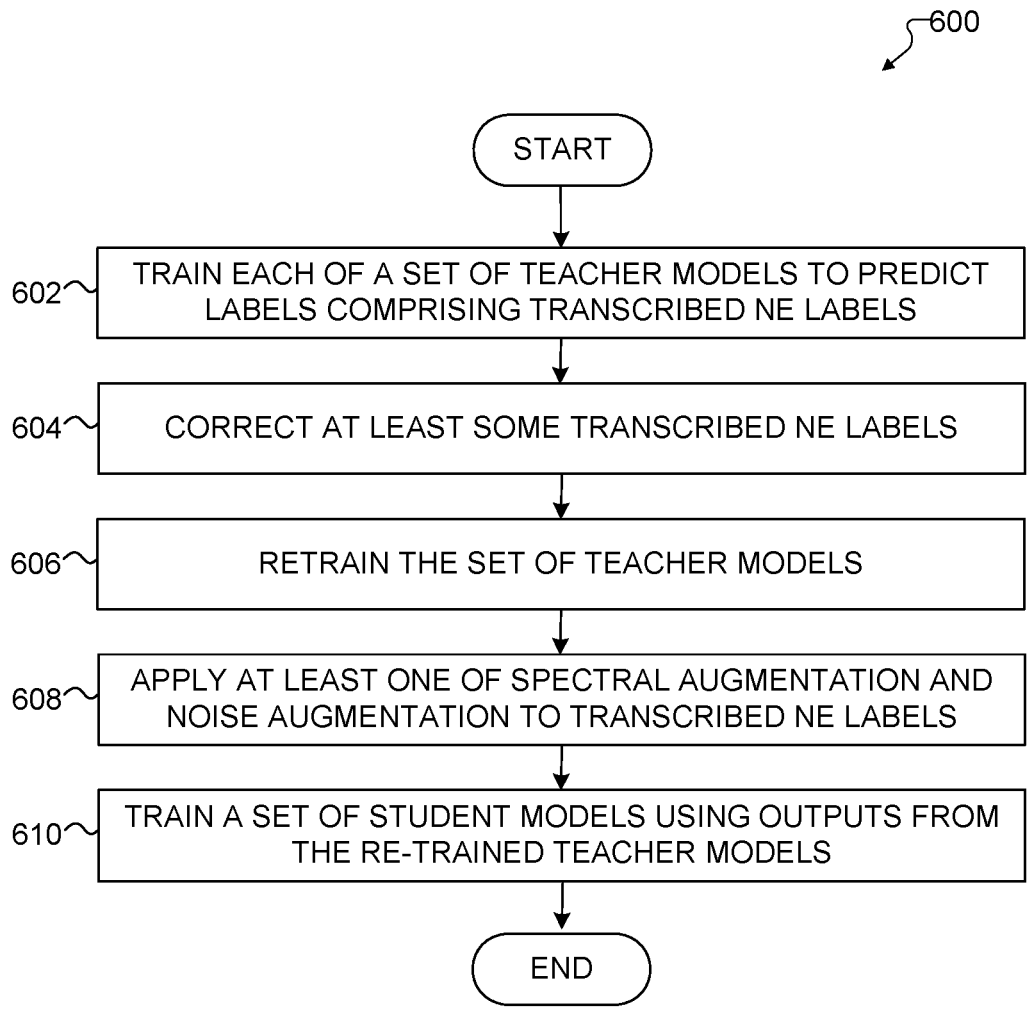
FIG. 6 illustrates an example method for improving NE recognition using an SSP according to this disclosure.

FIG. 6 illustrates an example method 600 for improving NE recognition using an SSP according to this disclosure. For ease of explanation, the method 600 shown in FIG. 6 is described as involving the use of the framework 200 shown in FIGS. 2 through 5 and the electronic device 101 shown in FIG. 1. However, the method 600 shown in FIG. 6 could be used with any other suitable electronic device (such as the server 106) and in any suitable system.

As shown in FIG. 6, each of a set of teacher models is trained to predict labels, including transcribed NE labels, at step 602. This could include, for example, the electronic device 101 training each teacher model 210 to transcribe unlabeled audio samples 205 and predict a pseudo labeled dataset 215 having multiple labels. At least some of the unlabeled audio samples 205 contain NE audio data. At least some of the labels include transcribed NE labels 218 corresponding to the NE audio data. At least some transcribed NE labels are corrected at step 604. This could include, for example, the electronic device 101 performing the user NE corrector process 220 using named entities 318 from the user NE database 225 to correct at least some of the NE labels 218 of each pseudo labeled dataset 215 and generate the updated pseudo labeled datasets 230.

The teacher models are retrained at step 606. This could include, for example, the electronic device 101 retraining the teacher models 210. In some embodiments, the teacher models 210 are retrained using the updated pseudo labeled dataset 230 of the teacher model 210 that exhibits the best performance during training. Spectral augmentation, noise augmentation, or both are applied to the transcribed NE labels at step 608. This could include, for example, the electronic device 101 performing the augmentation operation 235 to NE labels 218 of each updated pseudo labeled dataset 230. A set of student models is trained at step 610 using outputs from the retrained teacher models. This could include, for example, the electronic device 101 training the student models 240 using the updated pseudo labeled datasets 230. As a result of the training, a combined model 245 is generated.

Although FIG. 6 illustrates one example of a method 600 for improving NE recognition using an SSP, various changes may be made to FIG. 6. For example, while shown as a series of steps, various steps in FIG. 6 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   training, using at least one processor of an electronic device, a set of teacher models, wherein training the set of teacher models comprises:
   for each individual teacher model of the set of teacher models, training the individual teacher model to transcribe unlabeled audio samples and predict a pseudo labeled dataset comprising multiple labels;
   wherein at least some of the unlabeled audio samples contain named entity (NE) audio data; and
   wherein at least some of the labels comprise transcribed NE labels corresponding to the NE audio data;
   correcting, using the at least one processor, at least some of the transcribed NE labels using NEs that are selected from user-specific NE textual data, wherein the selected NEs are phonemically similar to NEs of the at least some of the transcribed NE labels; and
   retraining, using the at least one processor, the set of teacher models based on the pseudo labeled dataset from a selected one of the teacher models, wherein the selected one of the teacher models predicts the pseudo labeled dataset more accurately than other teacher models of the set of teacher models;
   wherein retraining the set of teacher models comprises penalizing at least one teacher model using a variable loss when the pseudo labeled dataset of the at least one teacher model includes at least one of the transcribed NE labels that is corrected.

2. The method of claim 1, further comprising:
   training a set of student models using outputs from the retrained set of teacher models to generate a combined model.

3. The method of claim 1, wherein each transcribed NE label includes a tag indicating a category of the transcribed NE label.

4. The method of claim 1, wherein the user-specific NE textual data comprises a database of user-specific NE textual data.

5. The method of claim 4, wherein correcting the at least some of the transcribed NE labels using the NEs that are selected from the user-specific NE textual data comprises:
   for each transcribed NE label of the at least some of the transcribed NE labels:
   determining that an NE of the transcribed NE label is not found in the database of user-specific NE textual data;
   selecting, from the database of user-specific NE textual data, an NE that is phonemically similar to the NE of the transcribed NE label; and
   replacing the NE of the transcribed NE label with the selected NE from the database.

6. The method of claim 1, further comprising:
   applying at least one of spectral augmentation and noise augmentation to the transcribed NE labels to improve accuracy for multiple noise conditions.

7. The method of claim 1, wherein penalizing the at least one teacher model using the variable loss comprises querying a configuration file to determine a size of a penalty.

8. An electronic device comprising:
   at least one memory configured to store instructions; and
   at least one processing device configured when executing the instructions to:
   train a set of teacher models, wherein, to train the set of teacher models, the at least one processing device is configured when executing the instructions to:
   for each individual teacher model of the set of teacher models, train the individual teacher model to transcribe unlabeled audio samples and predict a pseudo labeled dataset comprising multiple labels;
   wherein at least some of the unlabeled audio samples contain named entity (NE) audio data; and
   wherein at least some of the labels comprise transcribed NE labels corresponding to the NE audio data;

correct at least some of the transcribed NE labels using NEs that are selected from user-specific NE textual data, wherein the selected NEs are phonemically similar to NEs of the at least some of the transcribed NE labels; and retrain the set of teacher models based on the pseudo labeled dataset from a selected one of the teacher models, wherein the selected one of the teacher models is configured to predict the pseudo labeled dataset more accurately than other teacher models of the set of teacher models;

wherein, to retrain the set of teacher models, the at least one processing device is configured when executing the instructions to penalize at least one teacher model using a variable loss when the pseudo labeled dataset of the at least one teacher model includes at least one of the transcribed NE labels that is corrected.

9. The electronic device of claim 8, wherein the at least one processing device is further configured when executing the instructions to train a set of student models using outputs from the retrained set of teacher models to generate a combined model.

10. The electronic device of claim 8, wherein each transcribed NE label includes a tag indicating a category of the transcribed NE label.

11. The electronic device of claim 8, wherein the user-specific NE textual data comprises a database of user-specific NE textual data.

12. The electronic device of claim 11, wherein, to correct the at least some of the transcribed NE labels using the NEs that are selected from the user-specific NE textual data, the at least one processing device is configured when executing the instructions to:

for each transcribed NE label of the at least some of the transcribed NE labels:
determine that an NE of the transcribed NE label is not found in the database of user-specific NE textual data;
select, from the database of user-specific NE textual data, an NE that is phonemically similar to the NE of the transcribed NE label; and
replace the NE of the transcribed NE label with the selected NE from the database.

13. The electronic device of claim 8, wherein the at least one processing device is further configured when executing the instructions to apply at least one of spectral augmentation and noise augmentation to the transcribed NE labels to improve accuracy for multiple noise conditions.

14. The electronic device of claim 8, wherein, to penalize the at least one teacher model using the variable loss, the at least one processing device is configured when executing the instructions to query a configuration file to determine a size of a penalty.

15. A non-transitory machine-readable medium containing instructions that when executed cause at least one processor of an electronic device to:

train a set of teacher models, wherein the instructions that when executed cause the at least one processor to train the set of teacher models comprise instructions that when executed cause the at least one processor to:

for each individual teacher model of the set of teacher models, train the individual teacher model to transcribe unlabeled audio samples and predict a pseudo labeled dataset comprising multiple labels;

wherein at least some of the unlabeled audio samples contain named entity (NE) audio data; and wherein at least some of the labels comprise transcribed NE labels corresponding to the NE audio data;

correct at least some of the transcribed NE labels using NEs that are selected from user-specific NE textual data, wherein the selected NEs are phonemically similar to NEs of the at least some of the transcribed NE labels; and retrain the set of teacher models based on the pseudo labeled dataset from a selected one of the teacher models, wherein the selected one of the teacher models is configured to predict the pseudo labeled dataset more accurately than other teacher models of the set of teacher models;

wherein the instructions that when executed cause the at least one processor to retrain the set of teacher models comprise instructions that when executed cause the at least one processor to penalize at least one teacher model using a variable loss when the pseudo labeled dataset of the at least one teacher model includes at least one of the transcribed NE labels that is corrected.

16. The non-transitory machine-readable medium of claim 15, wherein the instructions when executed further cause the at least one processor to train a set of student models using outputs from the retrained set of teacher models to generate a combined model.

17. The non-transitory machine-readable medium of claim 15, wherein each transcribed NE label includes a tag indicating a category of the transcribed NE label.

18. The non-transitory machine-readable medium of claim 15, wherein the user-specific NE textual data comprises a database of user-specific NE textual data.

19. The non-transitory machine-readable medium of claim 18, wherein the instructions that when executed cause the at least one processor to correct the at least some of the transcribed NE labels using the NEs that are selected from the user-specific NE textual data comprise instructions that when executed cause the at least one processor to:

for each transcribed NE label of the at least some of the transcribed NE labels:
determine that an NE of the transcribed NE label is not found in the database of user-specific NE textual data;
select, from the database of user-specific NE textual data, an NE that is phonemically similar to the NE of the transcribed NE label; and
replace the NE of the transcribed NE label with the selected NE from the database.

20. The non-transitory machine-readable medium of claim 15, wherein the instructions that when executed cause the at least one processor to penalize the at least one teacher model using the variable loss comprise:

instructions that when executed cause the at least one processor to query a configuration file to determine a size of a penalty.

* * * * *